April 9, 1946. E. F. MARTINEC 2,397,971
GAUGING DEVICE
Filed March 15, 1943 3 Sheets-Sheet 1
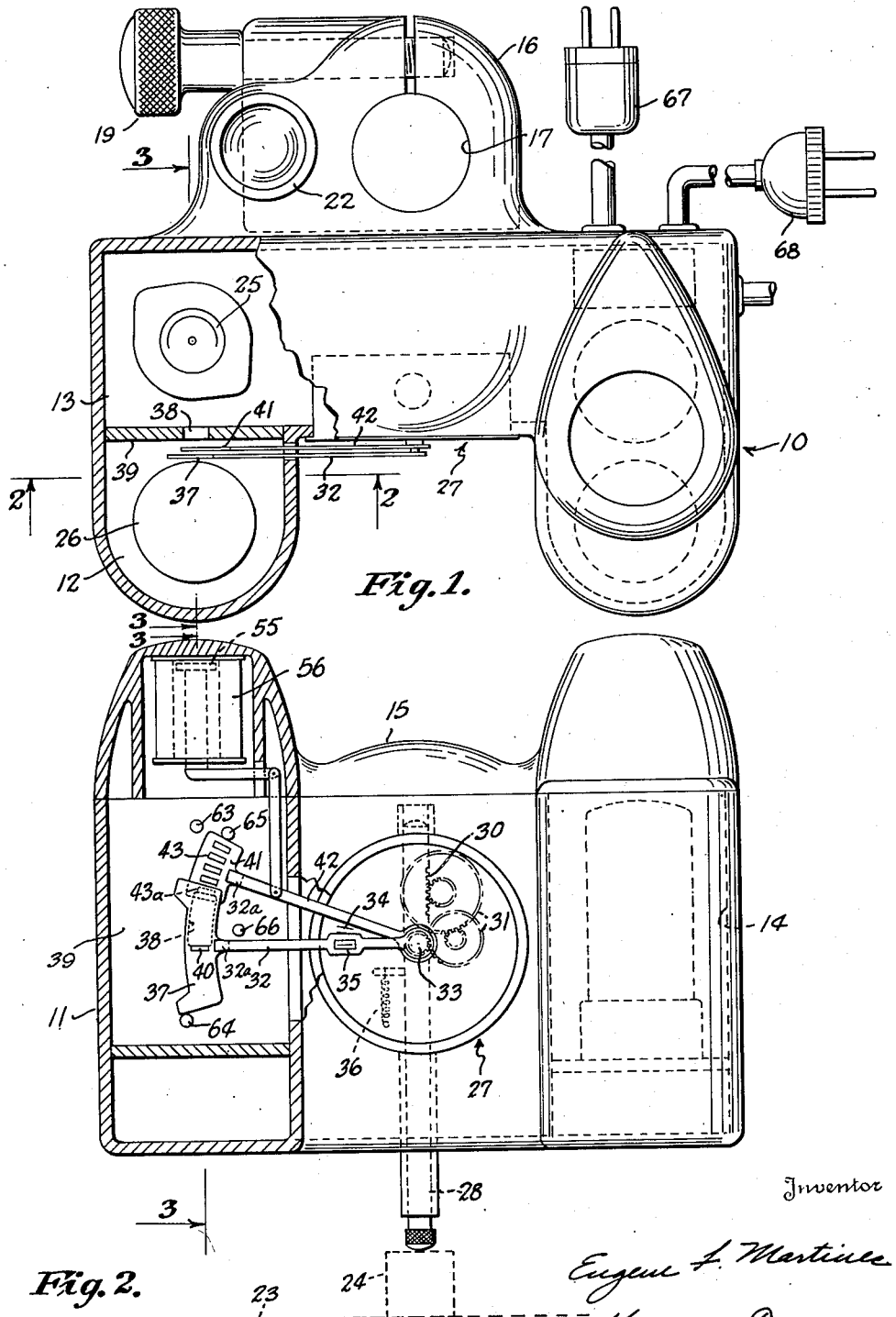

April 9, 1946.   E. F. MARTINEC   2,397,971
GAUGING DEVICE
Filed March 15, 1943   3 Sheets-Sheet 2

Inventor
Eugene F. Martinec
By Wooster & Davis
Attorneys

April 9, 1946.　　　E. F. MARTINEC　　　2,397,971
GAUGING DEVICE
Filed March 15, 1943　　　3 Sheets-Sheet 3

Inventor
Eugene F. Martinec
By Wooster † Davis
Attorneys

Patented Apr. 9, 1946

2,397,971

UNITED STATES PATENT OFFICE 2,397,971

GAUGING DEVICE

Eugene F. Martinec, Cleveland, Ohio

Application March 15, 1943, Serial No. 479,240

15 Claims. (Cl. 33—147)

This invention relates to gauging devices, particularly a limited capacity range indicating, sorting, counting or the like device controlled by a movable scanning means or shutter after an indicating element has been positioned by the element being gauged. It comprises an arrangement in which the indicating arm of a gauge is employed to interrupt a light beam to a photocell element, and is so arranged that after said arm has been shifted by the element being gauged and has come to rest and been positioned according to the characteristics of said element, a scanning element or shutter is moved relative to said arm to cooperate therewith to interrupt the light beam at the point determined by the position of said arm to operate an indicating, sorting, counting or like means. That is, the indicating, sorting, counting or the like is done after the indicating arm has come to rest and during the time the shutter or scanning means is in motion.

It has for an object to provide a simple and effective device for very accurately gauging various parts or elements, and one which can be employed to operate an indicating means, either visible, audible, element sorting or separating, and the like.

It is also an object to provide a device of this character in which the indicating means is controlled by interruption of a light beam which offers no resistance to movement of an element such as the indicating arm of a gauging means which is shifted or positioned by the element or part being gauged, so that there is nothing in the controlling means to affect the position determined by the dimensions of the element, and therefore, the indicating means will not affect the accuracy of the indication.

A particular object is to provide a device of this character which will insure sufficient time in the gauging operation for low-price high inertia translating equipment controlled by said gauging operation to function accurately and positively under all conditions.

It is another object to provide such a device which may be constructed and assembled as a unit, to be assembled and adjusted independently of its application and may be mounted as such unit on an application locating support in position for gauging desired parts or elements involved, and at the same time may be used in connection with the device with which it is so located to control operation of the device on the elements to be gauged to maintain them accurately within predetermined small limits.

Another object is to provide a device comprising a complete assembled unit which may be located and used as such, and includes a light-sensitive element with means connected therewith for connecting it with indicating means to be controlled, a light element to provide a light beam to the light-sensitive element, a movable means positioned to be affected by the element to be gauged, and means located between the light element and the cell element to control the light beam to the cell element including a movable member operated by said movable means to be positioned in accordance with the dimensions of the element to be gauged, and a second control element movable relative to the movable member after the member has been so positioned to determine the operation of the indicating means.

Another object is to provide a device in which it is possible to vary the tolerances desired.

Still another object is to provide a gauging device of this character in which the number of measuring units which parts being gauged vary from the basic desired size will be indicated.

A particular object is to provide a gauging means which will not only automatically gauge the elements within close limits, but in which the errors due to the human element in reading a gauge and depending on such readings are eliminated.

With the foregoing and other objects in view I have devised the construction illustrated in the accompanying drawings forming a part of this specification. It is, however, to be understood the invention is not limited to the specific construction and arrangement shown but may employ various changes and modifications within the scope of the invention. These drawings are somewhat diagrammatical, but show the device in sufficient detail that the principles of construction and operation may be readily understood.

In these drawings:

Fig. 1 is a top plan and partial section of the assembled device or unit;

Fig. 2 is a front elevation and partial vertical section thereof, the section being substantially on line 2—2 of Fig. 1;

Figure 3:
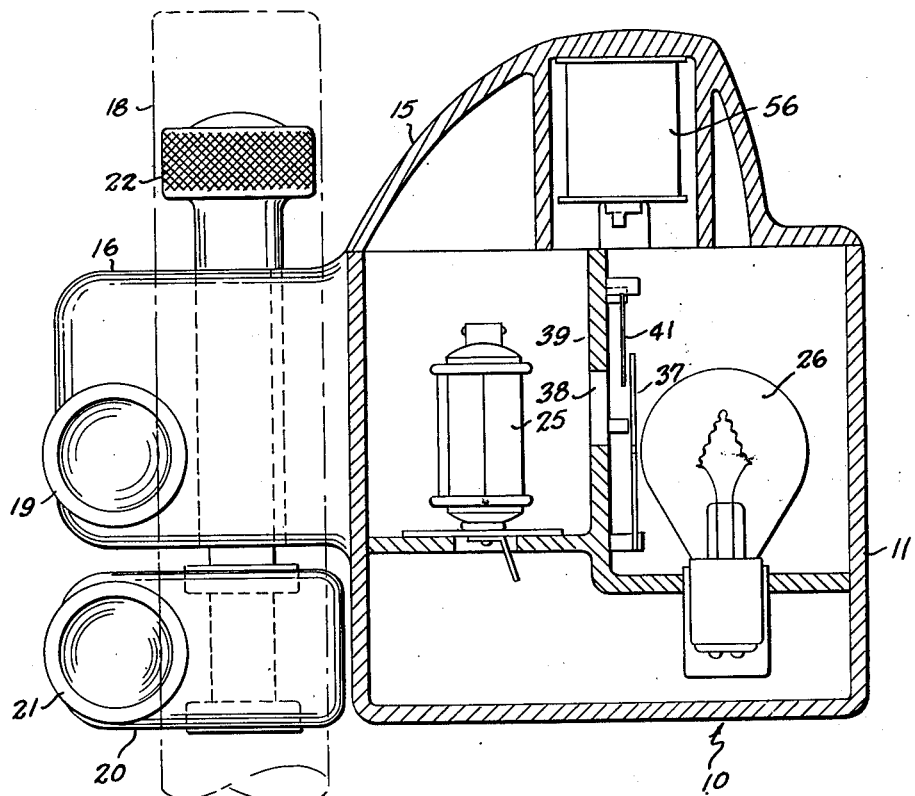
Fig. 3 is a partial vertical section and partial elevation looking from the left of Fig. 1, the section being substantially on line 3—3 of Figs. 1 and 2.

This invention was developed for the purpose of filling a definite need on the part of industry for gauging equipment capable of not only automatically gauging parts or elements to within .0001 inch or less, but which also could be used to automatically grade them and sort them into bins or receptacles according to size. Gauges now largely employed are dependent upon the human element to correctly read the gauge, and then depend on the operator to sort the articles according to such readings in the correct receptacle. The ordinary dial type of gauge is rather difficult to read and becomes extremely tiresome to the operator where a large number of pieces are handled, resulting in liability to error, which tendency increases as the number of pieces handled is increased. In an attempt to remedy this condition several so-called electro-limit gauges and other types of electric gauges have been developed which spread the indication of size over a much larger dial area so as to make them easier for the operator to read. All the electric gauges are extremely critical devices and require considerable setting and maintaining of adjustment, and in addition are quite expensive and complicated. In spite of the larger dial area for any given tolerance provided by these electric type gauges, they are still subject to the human element in correctly reading and sorting the pieces.

To overcome these difficulties and problems I have devised the present construction which will not only automatically register extremely small tolerances, but may also be employed to sort the measured piece into its correct receptacle. In this invention the extremely simple gear type dial gauge, which over a good many years has proved to be extremely durable and accurate, is employed, and there is built around it and assembled therewith in a complete unit, means of translating the reading given by the dial gauge into any amount of energy necessary for correctly indicating the reading or doing any type of feeding, grading, sorting, feed or adjustment control and the like. This has been accomplished without in any way affecting the accuracy, life or simplicity of the dial gauge.

This new device makes use basically of the indicator arm of the dial gauge for interrupting in various ways a beam of light focussed on a photocell element, and may be associated with an extremely stable, simple and economical amplifier (not shown), but whose operation will be readily understood. No special equipment in the form of special vacuum tubes, relays or other similar equipment is necessary as standard devices readily available on the market may be employed. As a beam of light offers absolutely no resistance to the passage of a solid through it, it will be understood that this system or device in no way affects the stability and accuracy of the simple dial gauge. The device is so constructed and arranged that no special optical system is required and a standard small incandescent filament type lamp developed for projector use may be employed. All vacuum tubes and relays used may be of standard types produced in large quantities for other purposes and therefore may be readily secured on the market.

This device employs the same fundamental principle of interruption of a light beam to establish or indicate the size of the part being gauged as described in my copending applications for patent for gauging device, filed of even date herewith, and designated Cases A & B, Ser. Nos. 479,239 and 479,430. However, with the arrangement shown in these applications, the movement of the indicating arm interrupting the light beam must be sufficiently slow to give signals, relays or other translating equipment time to operate during the time the light beam is interrupted. It should be remembered in this connection that for a three-inch diameter dial gauge of the gear type dial gauge mentioned above, the indicating arm moves approximately $\frac{3}{32}$ inch at its tip for every .0001 inch movement of the gauging stem. The present device is an improvement over the prior device in that it assures sufficient time for low-price high inertia translating equipment to function accurately and positively under all conditions regardless of the speed of movement of the indicating arm shifted or positioned by the gauging stem.

The device comprises a small and compact housing 10 made of suitable material, preferably a suitable molded plastic material or a die-casting, and may for convenience and simplicity of molding comprise two or more sections secured together, as for example in the present case, a body portion 11 having suitable chambers 12, 13 and 14 in which are mounted various elements of the device and some or all of which may open through one side of the body portion of the housing, as for example the top thereof, to facilitate mounting the elements in these chambers and gaining access thereto, and which chambers may be closed by a suitable top or closure section 15. The housing also includes a split lateral extension or frame 16 having an opening 17 therethrough to receive and embrace an application locating post or support 18, and on which it is adjustable to permit location of the housing in the desired position with relation to other elements and to position the indicating arm of the gauging element at zero or any other point, as determined by a master part and on which post or support it may be clamped in the adjusted position by a clamping screw 19. This post or support 18 might be mounted on an automatic machine, machine tool, or other device with which the gauging device is to be used. There is also provided a locking collar 20, also embracing the post or support 18 and split so that it may be clamped in the desired position on this post or support by a similar clamping screw 21. Frame portion 16 is connected to this collar by a micrometer adjusting screw 22 mounted for turning movement in the collar 20, but held therein against longitudinal movement, and having threaded connection with the housing frame 16.

This may be a single or double micrometer screw as desired, and is designed for close micrometer adjustments between the collar and the housing to properly locate the housing and the gauging means carried thereby with respect to the gauging table or support indicated diagrammatically at 23, and permit locating of the device with the indicating arm of the gauging means at zero position, or if preferred in any other position with respect to a master or standard part or element 24 with which the elements to be gauged are to be compared, as will be more fully described later. The collar 20 may be clamped in the desired position on the post or support 18 and after loosening the clamping screw 19 the housing may be raised or lowered by the micrometer screw 22 to the desired position and then clamped in this position by again tightening or setting the screw 19.

Mounted in the housing, as for example in the light tight chamber 13, is a light-sensitive or photocell element 25, and in the adjacent chamber 12 is a light source, such as a relatively small incandescent filament electric light element 26 to provide a beam of light to be projected on the cell element 25. Located between the light element and the cell element is means for controlling the effect of the light beam on the cell element, which means is in turn controlled by a means responsive to variations in the dimensions of the elements to be gauged. For this purpose, although various types of gauging or measuring mechanism may be used, I prefer a typical gear type dial gauge 27, which has over a good many years of use proven to be extremely durable and accurate. A satisfactory type of this mechanical gauging element is illustrated somewhat diagrammatically, and comprises a movable stem 28 guided for vertical sliding movement and projecting from the housing in position to engage the element to be gauged, such as master gauge block 24 used for setting the device and the element to be gauged, such for example as the circular element indicated diagrammatically at 29 in Fig. 6. It will be understood that this stem need not directly engage the element being gauged, but could engage an intervening member whose position is determined by the element so that the position of the stem is determined by this element. An example of such an arrangement is disclosed in my Patent No. 2,376,372, issued May 22, 1945. This movable stem 28 is connected by a rack 30 and suitable gearing 31 with an indicating arm 32 pivoted at 33, the gearing being such as to step up or amplify the movement of the stem 28 to give a much larger movement of the indicating arm. This arm may move over a suitable indicating dial 34 and have a zero setting slot 35 or other indicating means to indicate when it is in zero or any other position over the dial. A spring 36 tends to shift the stem 28 downwardly to engage the article being gauged.

Figure 5:
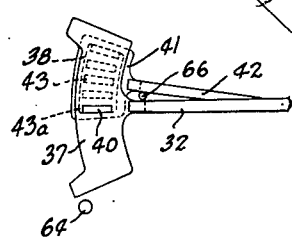
Fig. 5 is a diagrammatical view showing these parts in assembled relation but in a different position to that of Fig. 2.

The arm 32 is extended to a position between the photocell element and the light element and is provided with an elongated or arc-shaped head 37 over an elongated slot 38 in the dividing wall 39 between the chambers 12 and 13, and therefor between the light element 26 and the photocell element 25. The head 37 is provided with a slot 40 cooperating with this opening 38 and also with an intermediate control element or scanning shutter 41. The shutter element 41 is mounted on an arm 42 pivoted to swing about the same center 33 as the indicating arm 32, but is so mounted as to be movable independently of the arm. This shutter 41 is of somewhat greater length than the slot or opening 38 so that when the shutter is in its lowest position, as indicated in Fig. 5, it completely covers the opening 38. This shutter 41 is provided with a series of spaced slots 43, these slots being given a spacing corresponding to one measuring unit, as will be more fully described later. These two movable elements 37 and 41 are located in alignment and overlapping relation, as indicated in Figs. 1 and 2, and cooperate with each other and the opening 38 to control the light beam from the light source 26 to the photocell element 25, in a manner which will be more fully described later. As determined by the dimensions of a part or element to be gauged through this operation, they may be employed to control some device such for example as an indicating device, as either visible or audible indicating means, or a suitable sorting or separating mechanism for the elements gauged, or any other desired means. The term "indicating means" is used in a broad sense as meaning any one of a number of different devices, such for example as a physical indicator, an audible signal, sorting means, adjusting means, etc., or any device affected or controlled by the reaction of a light-sensitive cell due to interruption or change of the light beam.

As the movable control elements shown in Figs. 6, 7 and 8 and their operation is somewhat simpler than that of the elements of Figs. 2, 4 and 5, their operation will be described first. In the diagrammatical view of Fig. 6, the light-sensitive or photocell 25 is shown as connected by suitable wiring 44 with a suitable source of current, such for example as a battery 45, and a coil 46 operating a clapper 47 of a signal bell 48. This particular indicator is shown merely by way of example to indicate some device controlled by the cell. The mechanical gauging element 27 is also shown diagrammatically, and instead of showing the gear train connection between the stem 28 and the gauging arm 32, merely a conventional connection is shown to indicate that movement of the stem 28 upwardly swings the free end of the arm 32 upwardly or clockwise.

Figure 4:
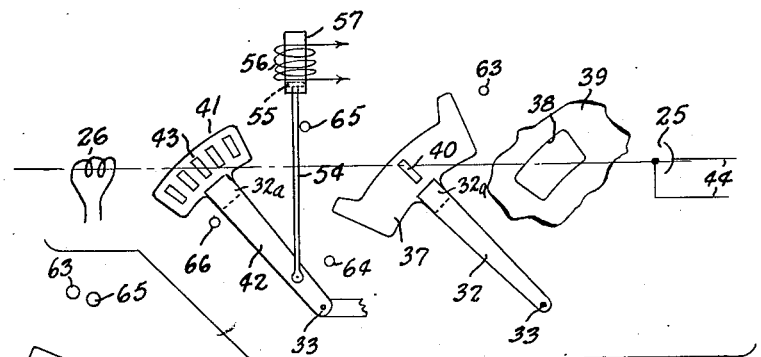
Fig. 4 is a diagrammatical view of the relatively movable control parts of the gauging means of Figs. 1, 2 and 3, showing them in separated relation.
Figure 6:
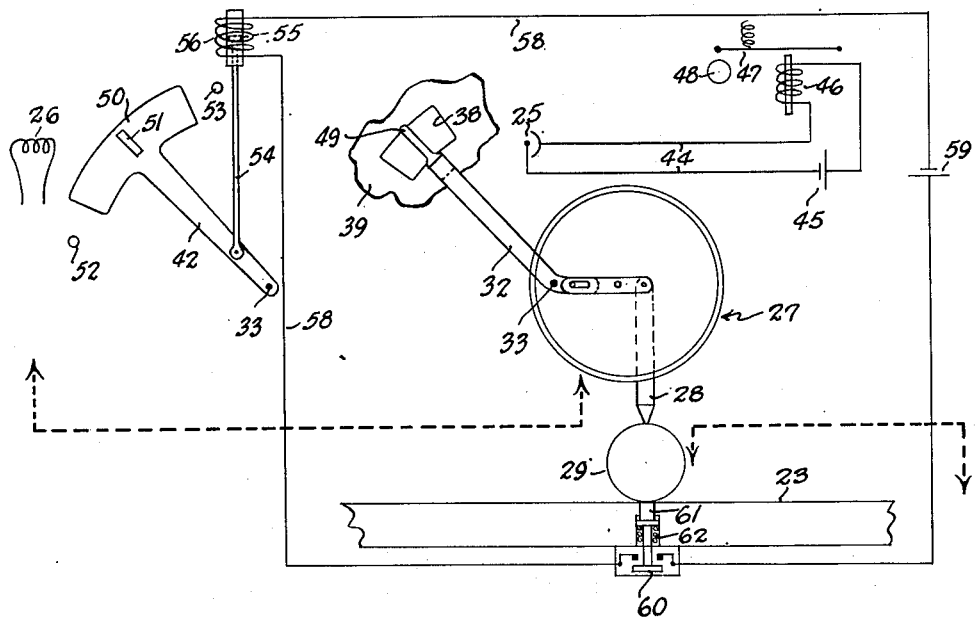
Fig. 6 is a diagrammatical view of a somewhat different construction of the relatively movable control parts of the gauging means in separated relation and similar to Fig. 4, and showing one arrangement of electrical connection which may be used and its relation to the gauging element and the article to be gauged.
Figure 7:
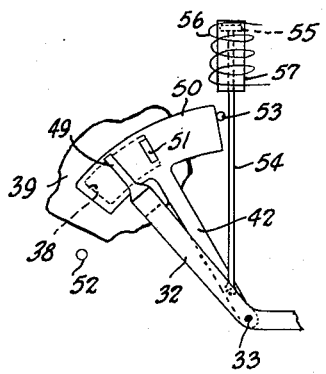
Fig. 7 is a diagrammatical view of the movable control parts of Fig. 6 in assembled relation and showing one position.
Figure 8:
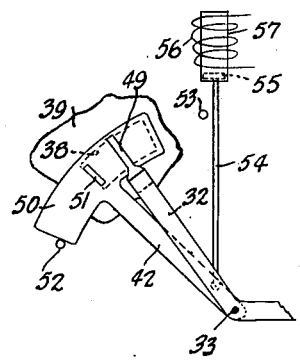
Fig. 8 is a similar view showing them in a different position.

In the showing of Figs. 6, 7 and 8, instead of the elongated head 37 having a slot 40 therein, as shown in Figs. 2, 4 and 5, a relatively narrow head 49 is employed, and the movable scanning shutter 50 between this head and the opening or slot 38 in the dividing wall 39 is somewhat longer than the shutter 41 and is provided with a single opening or slot 51 in alignment with the opening 38. The shutter 50 is of a length to cover the opening 38 at all times, the limits of its movement being determined by the stops 52 and 53. Connected with the shutter arm 42 is a rod 54 connected with the armature 55 of a slow-acting solenoid 56, this armature also including a plunger in a dashpot cylinder 57 to slow down its movement and is connected in a circuit 58 with a source of current supply 59 controlled by a switch 60, shown in Fig. 6 as associated with the gauging table 23 and controlled by a spring-pressed plunger 61. A spring 62 tends to shift the plunger upwardly and with it the movable switch element 60 to close the circuit through the solenoid 56. This plunger is also located opposite the gauging stem 28 so that when an element 29 is in gauging position the plunger is depressed to open the switch 16 to break the circuit to the solenoid, for a purpose presently to be described. This circuit can be controlled in several ways. With the plunger 61 as shown, when a part to be gauged is placed in position the plunger is depressed and with it the switch element and the circuit through the solenoid is broken, and when the element 29 is removed the circuit is again automatically re-established due to the spring return action of the plunger 61. This circuit can be controlled by hand, push-button or any of several different ways, depending on application of the gauge.

The operation of this device is as follows:

The operation of the device of Figs. 6, 7 and 8 will be described first. The indicating arm 32 is so arranged that its tip during normal measuring movement travels in front of the opening or slot 38 and within the confines of this slot. The shutter arm 42 is pivoted freely to swing about the same center 33 as the arm 32 and independently of arm 32. The head or tip 50 of the shutter arm forms a scanning shutter and is in the form of an arc, the length of this arc being more than twice the length of the slot 38 in the wall 39 so as to cover this slot at all times. The stop 53 limits the upward movement of the shutter and the shutter is normally held in the upper position by the solenoid 56, and this stop and the slot or opening 51 in the shutter are so arranged that when the shutter is drawn to its extreme high or upper position against this stop the slot 51 is just within the topmost part of the slot 38 as shown in Fig. 7, while the rest of the slot 38 is covered by the lower curved portion of the shutter. When the shutter is in its lowermost position, as determined by the stop 52, the slot 51 is just within the lower border of the slot 38, as shown in Fig. 8, and in this position the rest of the slot or opening 38 is covered by the upper curved portion of the shutter. Normally the circuit is closed through the solenoid 56 so that it draws the shutter to its extreme high position.

If a part 29 to be gauged is placed under the gauging stem 28 the gauging arm 32 will assume its measuring position depending on the size of the element 29. It should be noted that with the largest part to be gauged the end portion 49 of the gauging arm should never quite reach the topmost part of the slot 38. The circuit through the solenoid 56 is then broken by the action of the element 29 depressing the plunger 61 to open the switch 60, or the circuit could be opened by a hand switch, push-button or any of a number of different ways, depending on the application of the gauge. As this circuit is broken, due to the slow action of the solenoid plunger 55 which operates in a dashpot, the shutter 50 drops slowly downward until it hits the stop pin 52. It will be remembered that light shines through the slot 51 in the shutter and through the opening 38 in the photocell housing at all positions of the shutter arm. Then the only time the light beam from the source 26 is prevented from falling on the photocell element 25 is when the slot 51 in the shutter passes the tip 49 of the indicating arm.

Figure 9:
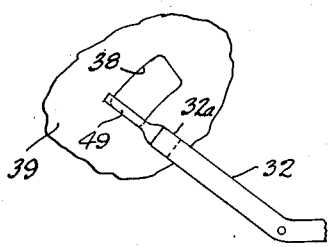
Fig. 9 is a diagrammatical view indicating the proper position of the indicating arm when a master block of the desired size is located under the gauging stem.
Figure 10:
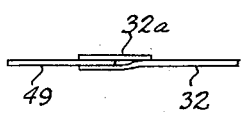
Fig. 10 is a side view of the free end of the indicating arm showing one way in which the tip may be detachably mounted on the arm.

Assuming by way of example that the tip 49 of the indicating arm is of a width equal to its movement caused by a change of one measuring unit in the article being gauged, the gauge will operate to accept all pieces which are exactly to size by giving one signal and reject those that are undersized by giving no signal, while rejection of those that are oversized will be indicated by two signals. To set the gauge, a master block or part 24 (Fig. 2) of the desired size is placed under the gauging stem 28 and the position of the housing is so set on the mounting post by adjusting the micrometer screw 22 that the tip 49 of the indicating arm is just within the lower limit of the slot 38, as shown in Fig. 9, care being taken that no light can penetrate between the lower edge of this tip and the lower edge of the slot 38. Now keeping in mind, as above indicated, that the slot 51 is never allowed by the stop pins 52 and 53 to leave the confines of the slot 38, it will be understood that the only way the light beam can be interrupted is when the indicating arm has assumed some position within the slot 38. If a part being gauged is too small, when it is placed under the gauging stem 28 the indicating arm will not come up high enough to reach into the slot 38 and consequently will not interrupt the light beam when the shutter is released by breaking the circuit through the solenoid 56 which allows the shutter to slowly drop down to the stop pin 52, and consequently no signal will result at any time during the travel of the shutter 50 down and up. If the part being gauged is of the correct size, when it is placed under the stem 28 the measuring arm 32 will assume a measuring position just high enough to cover the slot 51 in the shutter 50 when the shutter is in its lowermost position, and one signal will result. If the part being gauged is too large, the indicating arm will assume a position above the lower edge of the slot 38 and therefore will be in some position over the slot where light can pass both over and under the tip 49 of the indicating arm, as shown for example in Figs. 6, 7 and 8. In this case, when the shutter 50 moves down when the solenoid circuit is broken and then up when the solenoid 56 is again energized by closing the circuit, one signal will be given on the way down and one on the way up, resulting in two signals, indicating that the piece is too large. In no case should a part be gauged that is so large that it will swing the indicating arm beyond the upper edge of the slot 38. The tolerances desired can be obtained or varied by varying the width of the tip 49 of the indicating arm. If, for example, pieces varying two measuring units in size would be acceptable, the width of the tip 49 of the indicating arm would correspond to the movement caused by the difference of two measuring units instead of one as just described. Other tolerances would be secured accordingly by using tips of different widths. To facilitate this the tips may be detachably mounted in the indicating arm 32 by any suitable means. In the drawing the arm 32 is shown as provided with a spring clamp 32a within which the removable tip 49 may be inserted and held by the spring action.

It will be seen from the above that the light beam is interrupted by the slowly moving scanning shutter after the indicating arm has come to rest and been positioned according to the characteristic of the element being gauged, and the indicating, sorting, counting or the like is done only after this arm has come to rest and during the time the shutter is in motion.

In the form of the device shown in Figs. 2, 4 and 5, the principle of operation is the same but here the shutter and the indicating arm are so constructed and arranged that they may be used for determining or counting the number of measuring units that a part being gauged varies from the basic size.

As previously described, in this form the tip of the indicating arm 32 is widened into the form of an arc 37, which arc is of a length sufficient that in the normal movement of the indicating arm it never uncovers any portion of the slot 38, and this head 37 of the arm is provided with a slot 40. The length of the slot 38 is such that during the normal measuring travel of the indicating arm the slot 40 is always within the confines of the slot 38. Movements of this arm are limited by the stop pins 63 and 64. The pin 63 is so positioned that when the indicating arm is in its upper position the slot 40 is below the top edge of the slot 38 and pin 64 may be so positioned that when the arm 32 is in its lowermost position the slot 40 is just below the lower edge of the slot 38, as is shown in Fig. 2. Movements of the shutter arm 42 and of shutter 41 are limited by the stop pins 65 and 66. These stops 65 and 66 are so positioned and spaced that in the extreme high position of the shutter 41 the lowermost slot 43a in the shutter is higher than the top border of the opening 38, as shown in Fig. 2, while when the shutter is in its lowermost position this lowermost slot 43a is just within the lower border of the slot 38, as shown in Fig. 5. The shutter arm and the shutter are operated by the slow-acting solenoid 56 exactly as described above for the shutter in connection with Figs. 6 to 8.

To set the gauge, a master part 24 that is one measuring unit larger than the desired basic size is placed under the gauging stem 28, and the housing 10 is so adjusted by micrometer screw 22 that the indicating arm 32 is positioned so that the slot 40 is just in line with the lowest slot 43a in the shutter 41 when the shutter is in its lowest position against the stop pin 66, as shown in Fig. 5. Now, if a part to be gauged which is for example say three measuring units over the basic size, is inserted under the gauging stem 28, the gauging arm 32 will assume a position that will cause its slot 40 to line up with the third slot from the bottom in the shutter 41 when this shutter is in its lowest position. As previously described, the shutter 41 is normally held in its uppermost or highest position by the slow-acting solenoid 56, as shown in Fig. 2. After the part to be gauged is placed under the gauging stem 28 and then the shutter 41 allowed to drop slowly by breaking of the solenoid circuit, if as assumed above the part being gauged is three measuring units larger than the basic size, the indicating arm 32 will assume a position where the light beam will strike the photocell element 25 three times by the three lower slots 43 in the shutter coming into alignment with slot 40 in the indicator arm head 37 before the shutter 41 comes to rest against the stop pin 66. It is of course understood that the slots in the shutter are spaced one measuring unit apart; that is, they are spaced a distance equal to the movement of indicator slot 40 for one measuring unit. By means of this arrangement the actual number of measuring units that a part varies from some basic size can be translated due to the variations of electrical resistance because of the light beam interruptions on the photocell to any type of recording or sorting system desired. A plug 67 on a flexible cable may be provided for connecting the device to any such field application. A plug 68 may be provided on a flexible cable for plugging into any source of current as an outlet receptacle in the factory wiring system for operating the gauging unit. The recording or assorting is established with this arrangement before the piece is removed from under the gauging stem 28. If the piece being gauged is too small, that is, does not come within the limits indicated by the upper and lower slots 43 in the shutter 41, then the indicating arm 32 will not be raised sufficiently to carry the slot 40 into or over the slot 38 (that is, it will not be shifted from the position of Fig. 2) and therefore no signal will be given.

The capacity of the gauge can be increased to sort units varying by as many measuring units as desired, it being only necessary to increase the lengths of the arc shaped ends 37 and 41 on the indicator and shutter arms and increase the length of the slot 38.

In this construction, as in the first form, the indicating, sorting, counting, or the like is done only after the indicating arm has come to rest and during the time the shutter is in motion. That is, the indicator arm 32 is shifted and positioned by the element being gauged and then after it comes to rest the shutter 41 is moved past it.

In the first form of Figs. 6 to 9 where sorting or counting is not desired, the total signals given during the downward and upward movement of the shutter 41 is used, while in the construction of Figs. 2, 4 and 5 where sorting or counting is desired only those signals given during downward movement of the shutter are used.

It will be understood in each form the operation may be reversed. That is, the shutter may be normally in its lower position with the circuit through the solenoid 56 open and when a part is gauged the circuit will be closed so that the solenoid will operate to raise the shutter to the upper position, the coaction with the indicating arm and light beam being the same.

Although this device has been illustrated and described in a set-up for gauging a series of round elements, it is to be understood that this set-up has been given merely as one example of the large number of applications for which the device is adapted. In other words, it is not limited to the application specifically described and illustrated, but may be employed for a large number of different applications and controls. Examples of these are shown in Figs. 8 to 12 inclusive of my copending application, Serial No. 479,239, filed of even date herewith and designated as Case A.

These figures with their descriptions give examples of various different applications in which the device may be used for controlling various devices and effects, and their description and illustration are not included in this application in order to simplify and reduce the amount of disclosure in the present case and avoid unnecessary repetition.

Having thus set forth the nature of my invention, what I claim is:

1. A gauging device comprising a photocell element, means for connecting said element with a device to be controlled, a light element positioned to provide a light beam to the cell element, a wall between the light element and the cell element provided with an opening for passage of the light beam, a movable member including a portion movable over said opening, a scanning shutter movable over and normally covering said opening and provided with an opening in alignment with the first opening adapted to be covered by the movable member, a gauging stem adapted to engage an article to be gauged, an operative connection from the stem to the movable member to position the member according to the size of the article, and means for causing movement of the shutter relative to said member after it has been so positioned.

2. A gauging device comprising a photocell element, means for connecting said element with a device to be controlled, a light element positioned to provide a light beam to the cell element, a wall between the light element and the cell element provided with an opening for passage of the light beam, a pivoted member including a portion movable over said opening, a scanning shutter, a pivoted arm carrying said shutter for movement over said opening, said shutter being of a size to normally cover said opening and provided with a smaller opening in alignment with the first opening, a movable member positioned to be affected by the element to be gauged, an operative connection between said movable member and the pivoted member to position the latter member according to the size of the element, means to cause the shutter to move over the first opening after the pivoted member has been so positioned, and said movable portion of the pivoted member including means to control passage of the light beam through the shutter.

3. A gauging device comprising a photocell element, means for connecting said element with a device to be controlled, a light element positioned to provide a light beam to the cell element, means between the light and the cell to control passage of the light beam comprising a movable member and a movable scanning shutter in overlapping relation and movable relatively to each other, a gauging stem adapted to engage an article to be gauged, an operative connection from the stem to the member to position the member according to positioning of the stem by the article, cooperating means on the member and the shutter to control the light beam, and means for causing movement of the shutter relative to the member after the member is positioned by the stem.

4. A gauging device comprising a photocell element, means for connecting said element with a device to be controlled, a light element positioned to provide a light beam to the cell element, means between the light and the cell to control passage of the light beam comprising a movable member and a scanning shutter in overlapping relation, means for mounting the member and shutter for independent movement, a second movable member positioned to be affected by the element being gauged, an operative connection from the second movable member to the first movable member, means for causing movement of the shutter relative to the first member, and cooperating means on the first member and shutter operable because of said movement to control the light beam.

5. A gauging device comprising a photocell element, means for connecting said element with a device to be controlled, a light element positioned to provide a light beam to the cell element, means between the light and the cell to control the light beam comprising a scanning shutter and a movable member in overlapping relation and mounted for independent movement, said shutter having an opening therein for passage of the light beam, means positioned to be affected by the element being gauged and connected with the member to position said member, means for causing movement of the shutter relative to the member after the member is so positioned, and said member including means adapted to cooperate with said shutter opening to control the light beam during said movement.

6. A gauging device comprising a photocell element, means for connecting said element with a device to be controlled, a light element positioned to provide a light beam to the cell element, means between the light and the cell to control the light beam comprising a scanning shutter and a movable member in overlapping relation and mounted for independent movement, said shutter having an opening therein for passage of the light beam, said member being of a width to cover said opening to interrupt the light beam, means positioned to be affected by the element being gauged and connected with the member to position said member, and means for causing movement of the shutter relative to the member after the member is so positioned.

7. A gauging device comprising a photocell element, means for connecting said element with a device to be controlled, a light element positioned to provide a light beam to the cell element, means between the light and the cell to control the light beam comprising a scanning shutter and a movable member in overlapping relation and mounted for independent movement, said shutter being provided with a series of laterally spaced openings therein adapted for passage of the light beam, said member including a portion of sufficient width to normally cover said openings and provided with an opening adapted for alignment with the shutter openings, means positioned to be affected by the element being gauged and connected with the member to position said member, and means for causing movement of the shutter relative to the member after the member is so positioned.

8. A gauging device comprising a photocell element, means for connecting said element with a device to be controlled, a light element positioned to provide a light beam to the cell element, means between the light and the cell to control the light beam comprising a scanning shutter and a movable member in overlapping relation and mounted for independent movement, said shutter and member being provided with cooperating means to control the light beam by relative movement between them, means positioned to be affected by the element being gauged and connected with the member to position said member, and means for causing movement of the shutter relative to the member after the member has been so positioned to control said beam.

9. A gauging device comprising a photocell element, means for connecting said element with a device to be controlled, a light element positioned to provide a light beam to the cell element, means between the light and the cell to control the light beam comprising a scanning shutter and a movable member in overlapping relation and mounted for independent movement, said shutter and member being provided with cooperating means to control the light beam by relative movement between them, means positioned to be affected by the element being gauged and connected with the member to position said member, a solenoid including a slowly acting plunger connected with the shutter, and means to control the solenoid to cause movement of the shutter relative to the member to control the light beam.

10. A gauging device comprising a photocell element, means for connecting said element with a device to be controlled, a light element positioned to provide a light beam to the cell element, means between the light and the cell to control the light beam comprising a scanning shutter and a movable member in overlapping relation and mounted for independent movement, said shutter having an opening therein for passage of the light beam, said member being of a width to cover said opening to interrupt the light beam, a solenoid including a slowly acting plunger connected with the shutter and arranged to normally hold the shutter in its upper position, means positioned to be affected by the element being gauged and connected with the member to position said member, an electric circuit including said solenoid, and means for controlling the circuit to permit the shutter to move downwardly past the member after the member has been so positioned.

11. A gauging device comprising a photocell element, means for connecting said element with a device to be controlled, a light element positioned to provide a light beam to the cell element, means between the light and the cell to control the light beam comprising a scanning shutter and a movable member in overlapping relation and mounted for independent movement, said shutter being provided with a series of laterally spaced openings therein for passage of the light beam, said member including a portion of sufficient width to normally cover said openings and provided with an opening adapted for alignment with the shutter openings, means positioned to be affected by the element being gauged and connected with the member to position the member, a solenoid including a slowly acting plunger connected with the shutter and normally holding the shutter in an upper position, an electric circuit including said solenoid, and means for controlling said circuit to permit the shutter to move downwardly past the member after the member has been so positioned to control the light beam.

12. A gauging device comprising a housing, a photocell element mounted in the housing, means for connecting said element with a device to be controlled, a light element mounted in the housing and positioned to provide a light beam to the cell element, a mechanical gauging element mounted in the housing including a pivoted member between the light element and the cell element and a movable member in position to be affected by the element being gauged to position said pivoted member, a movable shutter in overlapping relation with said pivoted member, said shutter and pivoted member being provided with cooperating means to control the light beam by relative movement between them, and means for controlling movement of the shutter relative to the pivoted member to control the light beam.

13. A gauging device comprising a housing, means for adjustably mounting the housing on an application locating support, a photocell element mounted in the housing, means for connecting said element with a device to be controlled, a light element mounted in the housing and positioned to provide a light beam to the cell element, a wall between the light element and the cell element having an opening for passage of the light beam, a mechanical gauging element mounted in the housing including a pivoted member movable over said opening and means positioned to be affected by the element being gauged and connected with the member to position the member, a scanning shutter movable over said opening independently of said member, said shutter normally covering said opening and provided with an opening in alignment with the first opening, said member being of a width to cover the shutter opening to control said beam, a slow acting solenoid mounted in the housing including an armature connected with the shutter, and an electric circuit controlling the solenoid to control movement of the shutter relative to the member to control the light beam.

14. A gauging device comprising a housing, means for adjustably mounting the housing on an application locating support, a photocell element mounted in the housing, means for connecting said element with a device to be controlled, a light element mounted in the housing and positioned to provide a light beam to the cell element, a wall between the light element and the cell element having an opening for passage of the light beam, a shutter movable over said opening and provided with a series of spaced openings, a mechanical gauging element mounted in the housing including a pivoted member having a portion movable over the first opening and of a width to normally cover said opening, said member being provided with an opening adapted for alignment with the openings in the shutter to control the light beam, means positioned to be affected by the element being gauged and connected with the member for positioning the member, a slow acting solenoid including an armature connected with the shutter, and an electric circuit controlling the solenoid to control movement of the shutter relative to the member to control the light beam.

15. A gauging device comprising a photocell element, means for connecting said element with a device to be controlled, a light element positioned to provide a light beam to the cell element, means between the light and the cell to control the light beam comprising a scanning shutter and a movable member in overlapping relation and mounted for independent movement, said shutter and member being provided with cooperating means to control the light beam by relative movement between them, a gauging stem adapted to engage an article being gauged and connected with the member to position said member, a slow acting solenoid including an armature connected with the shutter for controlling movement of the shutter, a support opposite the gauging stem for positioning the element to be gauged, an electric circuit for controlling the solenoid, and means adapted to be positioned by the element being gauged when it is in gauging position to control said circuit.

EUGENE F. MARTINEC.